July 10, 1962  R. D. PARRY  3,043,043
FISHING LINE ATTACHMENT
Filed Feb. 4, 1959
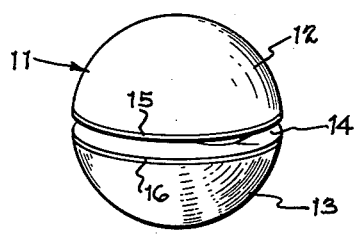
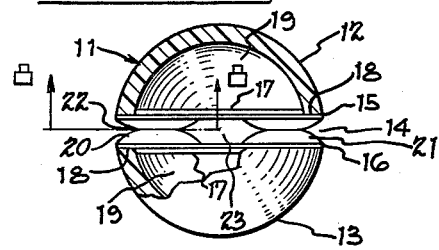
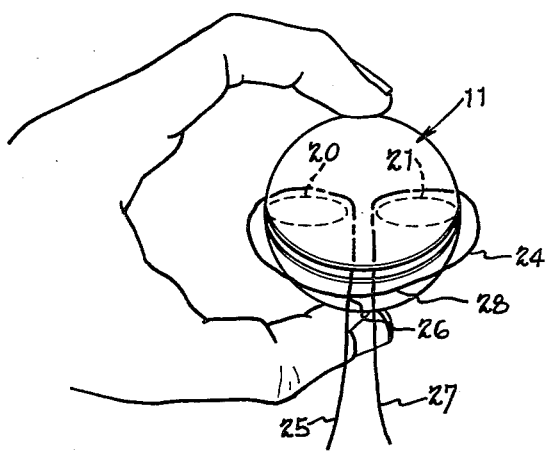
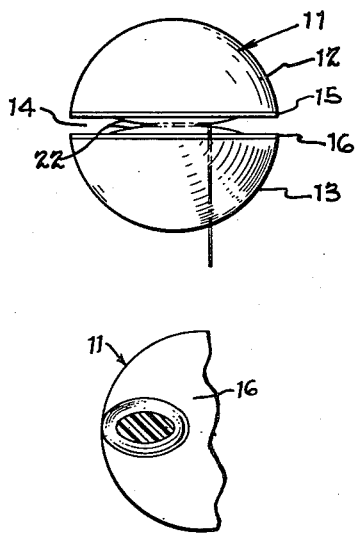
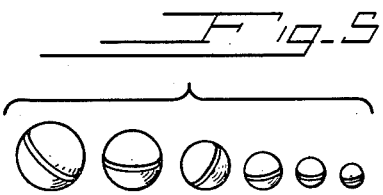
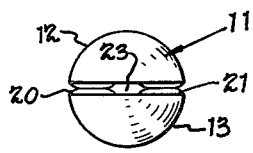
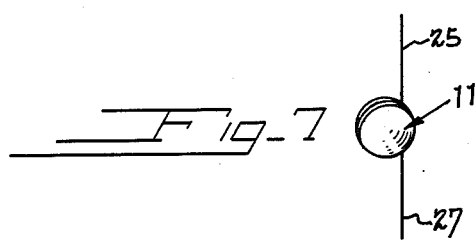
INVENTOR.
Robert D. Parry.
BY
Wood, Herron & Evans.
ATTORNEYS.

United States Patent Office 3,043,043
Patented July 10, 1962

3,043,043
FISHING LINE ATTACHMENT
Robert D. Parry, 1336 Custer Ave., Cincinnati, Ohio
Filed Feb. 4, 1959, Ser. No. 791,179
1 Claim. (Cl. 43—43.1)

This invention relates to devices such as the "sinkers" used by fishermen to add weight to fishing lines, and also to the "floats" which are used to impart buoyancy to fishing lines and the bait attached thereto. More particularly, it has reference to an improvement in sinkers and floats and to a novel arrangement of attaching these devices, or either of them, to fishing lines.

Sinkers are attached to fishing lines to keep the bait immersed, particularly where the bait used is of light weight and would otherwise float on the surface of the water. The sinkers used for this purpose consist of small weights, or "shot" usually molded in lead, which may be attached by the fisherman at such positions along the line as he desires; it is a common practice to attach the sinker either to the line itself or to the terminal extension of the line, that is, to a "leader." As a means of permitting the shot to be attached at any point along the line or leader, the shot is "split," that is, it is deeply noched, the notch usually extending past the center of the shot. Such sinkers are commonly known as "split shot." To attach split shot, the fisherman places the line or leader, as the case may be, in the notch as far as possible and then, usually with pliers but some times with his teeth, squeezes the shot so that the "jaws," or portions of the shot adjacent the notch are brought together, the line thus being held squeezed between these jaws. In other words, the shot is "crimped" onto the line. Certain difficulties attend this method of attaching shot to a line. In the first place, the fisherman must carry pliers with him on his trip in order to crimp the sinker onto the line, or else he is forced to rely upon his teeth, which is not an entirely desirable procedure either. Secondly, once the shot has thus been attached, it is very difficult if not altogether impossible to remove the split shot from the line, or to move it to a new position along the line or leader, as a result of the deformation of the shot which occurs from the pressure which must be applied to insure that the shot is strongly secured to the line. Furthermore, this method of attachment proves damaging to the line as well: when tightly squeezed over the line, the edges of the jaws tend to bite into the line and cut the fibers of the threads of which the line is woven. Because of these factors, it can be seen that for the sinker to be tightly secured to the line and yet not damage the line, exactly the right amount of pressure must be applied when it is being attached to the line, for if too little pressure is applied, the sinker may fall off, while on the other hand, if too much pressure is applied, damage to the line will result. These problems become accentuated where it is desired to attach a sinker to what is known as "mono-filament" line, which is made of a single strand of an extruded plastic material. In that it is solid rather than woven, such a leader is less compressible than the woven type and is slippier as well, so that it is more difficult to attach a split shot to it securely. And, because of its single strand character, it is more easily cut transversely by the shot because the edges of the jaws bite into it. Instead of crimping a split shot over a mono-filament line, it is a common practice to use a difficult type of sinker, one which may be tied to one end of the leader. However, this is not an entirely satisfactory approach either, because the leader materials tend to kink very readily, and are usually permanently deformed once they have been tied to such a sinker.

The sinker provided by this invention is one which may easily be attached to either a multi-strand woven line and equally well to a mono-filament line. It may quickly be removed from the line to which it has been attached without injury either to the line or to itself; there is no deformation of the sinker, nor is the line kinked. It may be attached to the middle of the line though both ends of that line are secured, and, while it will not slide or shift its position longitudinally on the line accidentally, the fisherman may if he desires move it to a new location on the line without removing it from the line.

While the invention has thus far been described in relation to sinkers, inasmuch as its advantages are perhaps most readily apparent in contrast to split-shot sinkers, the principle embodied in the invention and the method of attachment of the invention may equally well be applied to other devices which are intended to be attached to fishing lines. For example, fishing floats may be made according to the invention and, so made, may be attached to the line with the same facility and advantage. Heretofore, floats have usually been tied to fishing lines. A float made according to this invention may be attached to a line without tying and consequently without injury to or kinking of the line, just as sinkers made according to the invention may be attached.

Briefly put, the concept behind this invention is the idea of wedging the line to which the device is to be attached into uniquely shaped grooves provided in the sinker or float, as the case may be. These grooves are so formed that at no point does the line pull transversely on itself. In this way, kinks are avoided and the line does not tend to cut itself.

In the drawings:

FIGURE 1 is a perspective view of a float made according to the invention.

FIGURE 2 is a partial sectional view of the float.

FIGURE 3 indicates the way in which a line is attached to the float.

FIGURE 4 is an end view of the float having a line attached.

FIGURE 5 illustrates a number of different sizes of sinkers, all embodying the principle of the invention.

FIGURE 6 is a front view of a sinker.

FIGURE 7 shows the attitude of a sinker attached to a line where the line is under tension.

FIGURE 8 is a cross-section taken on line 8—8 of FIGURE 2 showing the oval shape of the posts.

A preferred embodiment of a float made according to this invention is indicated generally at 11 in the drawings. As is best seen in FIGURE 2, the float has a substantially hemispherical top part 12, a similar bottom part 13, and a connector portion 14 between the top and bottom members. The top and bottom parts 12 and 13 are hollow hemispherical shells having a planar annular ring between the inner and outer surfaces of the shells of the hemisphere. The connector 14 has a parallel top and bottom 15 and 16 respectively, which are circular in outline and of a diameter equal to that of the outside surface of the hemispheres. The top and bottom both have raised central bosses 17 which face in opposite directions and which are of diameter equal to the inside diameter of the hemisphere. Between the bosses and the edges of the connector is an annular rim 18. The top hemisphere 12 is seated on the top 15 of the connector so that the boss extends into the interior of the hollow hemisphere, centering the hemisphere on the connector, the rim 18 residing in juxtaposition with the annular ring of the hemisphere between its inside and outside surfaces. The bottom hemisphere 13 is similarly seated on the bottom 16 of the connector. The hemispheres are fastened in these positions by cement or other conventional means. In addition to spacing and connecting the two hemispheres, the top and bottom surfaces of the connector also seal off the open side of the hollow interiors, the hemispheres and the connector together thereby forming water-tight flotation chambers 19 which impart the necessary buoyancy to the float. Two posts 20 and 21 extend at right angles between the top and bottom of the connector, the posts being spaced apart from one another along a diameter of the connector. In transverse cross section, that is, in a section taken parallel to the top of the connector, these posts are rounded; preferably they are oval in outline, as shown in FIGURE 8. Each post contains a deep circumferential groove 22 which extends entirely around the post, the deepest point of each groove being approximately at the midsection of the post, that is, halfway between the top and bottom. Otherwise expressed, the walls of each post flare sharply outwardly from the midsection of each post so that a relatively small angle is formed between the walls at that section. Spaced apart from one another, and together with top 15 and bottom 16 of the connector these posts define an opening 23 extending transversely through the connector. From FIGURE 2 it may be seen that the grooves 22, as they extend entirely around each post, are contiguous with the opening 23 in the region between the posts. From FIG. 4 it can be seen that the central axes of said posts are aligned along a single diameter of said planar surfaces, and from FIGS. 2 and 6 it can be seen that points on their ends are coincident with the peripheries of said planar surfaces.

It is through the provision of these grooved posts 20 and 21 in the spaced relation shown that a fishing line may be attached to the float without the necessity of crimping the float or tying the line to it. The connection of a line 24 to the float is illustrated in FIGURE 3. A standing part of the line 25 extends through the opening 23 between the posts 20 and 21, turns 270 degrees around the left-hand post 20 in the groove of that post crossing over itself as at 26 and around the other post 21 in like fashion, so that standing part 25 lies parallel to another part 27. When, in use, the standing parts 25 and 27 of the line are put under tension, as in FIGURE 7, they lie parallel to the immediately adjacent parts of the loop 28 formed in the line, so that at no point does the line pull on itself angularly. Because of the small angle formed between the sloping sides of the groove, the line becomes wedged in the groove all the way around each post and is held from sliding longitudinally in the groove by compression and friction. Therefore, in use, the float cannot accidentally be slid along the line from the point at which it was attached, the grooves holding it securely in place. Furthermore, the result of the relatively big radius of the cross-section of the post relative to the thickness of the line, the line does not become kinked as it passes around the post, even when it is under tension. That is, no where is the line so sharply bent as to cause a kink to form. It is impossible even for a mono-filament line to kink when used with this float.

The convenient manner of attaching the float to the line is as follows: The line, at the position at which the float is to be attached, is doubled, that is, one part of the line is laid against and parallel to an adjacent part of the line. This doubled portion is slipped through the opening 23 between the posts, and is then opened to form a loop on the side of the float opposite the two standing parts. While holding the float as in FIGURE 3, this loop is brought back over the top of the float through 180 degrees so that it then lies transversely across the two standing parts. The standing parts are drawn away from the float so that the loop is "set" tightly in the groove around the floats. It may be seen that, by using this method, the line may be attached to the float even though the two ends of that line are secured, since the line only need be formed into a loop.

The float of this invention may most conveniently be molded in plastic in three parts including the two hollow hemispheres 12 and 13, and the middle connector element 14, the three being fastened or glued together in the manner previously described. Alternatively, if the plastic is of low density and is itself lighter than water, the hemispheres need not be hollow, so that the entire float may be cast as a single integral unit. It should be noted in passing that while the members 12 and 13 have been specified as hemispheres, they need not in fact be hemispherical. That shape is simply a convenient configuration for them and one which minimizes the tendency of the float to snag on weeds or rocks when being used.

Sinkers may be made according to this invention in a manner very similar to that already described in relation to the construction of floats. Of course, sinkers are made of a heavy material, preferably lead, and do not have the flotation chambers 19 shown in connection with the float. Also a sinker is normally of considerably smaller size than the float shown but this is a difference of degree only. The principle and method of attachment remain the same regardless of the size or weight of the object which is to be attached to the line. The variety of sizes in which sinkers may be made is illustrated in FIGURE 5. It is most convenient to cast a sinker in lead as an integral unit.

Having described my invention, I claim:

An attachment for connection to a fishing line comprising, two opposed hemispheres each having a planar surface of circular outline, said planar surfaces being disposed in parallel spaced relationship, two spaced posts of completely rounded section connecting said hemispheres and extending right angularly between said planar surfaces, the central axes of said posts respectively intersecting a single diameter of each of said planar surfaces, both ends of each of said posts having a point on their periphery in coincidence with said circular outlines of said planar surfaces to which they are connected, each of said posts being provided with a substantially annular V-shaped groove extending completely therearound, the sides of each of said grooves extending continuously from said planar surfaces to an apex at the center of said posts, the size and relative angulation being such that each groove, when receiving said line, is adapted to secure said line completely around said apex and to wedge parallel parts of said line in said groove against each other.

References Cited in the file of this patent

UNITED STATES PATENTS

| | | |
|---|---|---|
| 523,377 | Pumyea | July 24, 1894 |
| 594,989 | Finn | Dec. 7, 1897 |
| 689,497 | Kepler | Dec. 24, 1901 |
| 716,607 | Wood | Dec. 23, 1902 |
| 778,253 | Leightham | Dec. 27, 1904 |
| 2,038,108 | Henley | Apr. 21, 1936 |
| 2,536,159 | Darkins | Jan. 2, 1951 |
| 2,753,652 | Romaine | July 10, 1956 |
| 2,787,079 | Wilson | Apr. 2, 1957 |